United States Patent [19]

Crawford

[11] 4,373,831
[45] Feb. 15, 1983

[54] KEY DEVICE FOR LOCKING AN ELEMENT TO A SHAFT

[75] Inventor: John P. Crawford, Marion, Ind.

[73] Assignees: Thomas A. Grogg; Clarence C. Turner, both of Marion, Ind. ; part interest to each

[21] Appl. No.: 329,745

[22] Filed: Dec. 11, 1981

[51] Int. Cl.³ ............................................... F16D 1/06
[52] U.S. Cl. ..................................... 403/318; 403/358
[58] Field of Search ......................... 403/356, 358, 318

[56] References Cited

U.S. PATENT DOCUMENTS

| | | | |
|---|---|---|---|
| 2,676,849 | 4/1954 | Houck et al. | 403/356 X |
| 3,424,019 | 1/1969 | Wolfram | 403/356 X |
| 3,513,802 | 5/1970 | Potter | 403/358 X |
| 3,994,604 | 11/1976 | Visser | 403/318 X |

FOREIGN PATENT DOCUMENTS 341283 9/1921 Fed. Rep. of Germany ...... 403/358

*Primary Examiner*—Andrew V. Kundrat
*Attorney, Agent, or Firm*—Gust, Irish, Jeffers & Hoffman

[57] ABSTRACT

A key device for locking an element to a shaft for rotation therewith includes a key-engaging surface on the shaft which is provided with first and second opposite ends and angles radially inwardly toward the shaft axis. The first end of the key-engaging surface is located at the shaft periphery, and the shaft is provided with a radially extending shoulder at the second end of the key-engaging surface. An element to be secured to the shaft has a shaft-receiving opening which receives that portion of the shaft having the key-engaging surface. The element is provided with an outer side and a radially extending keyway which opens through the shaft-receiving opening in registry with the key-receiving surface. The keyway is provided with a rear cam surface which extends angularly from the outer side of said element at a point radially spaced outwardly from the shaft-receiving opening to the shoulder on the shaft. A key is received by the keyway, and is provided with a follower surface engaged with said cam surface and a first side portion engaged with said key-engaging surface. A threaded fastener secured to one of said elements and shaft is engaged with a second side portion of the key for retaining the key in the keyway and forcing it into engagement with the key-engaging surface.

6 Claims, 6 Drawing Figures

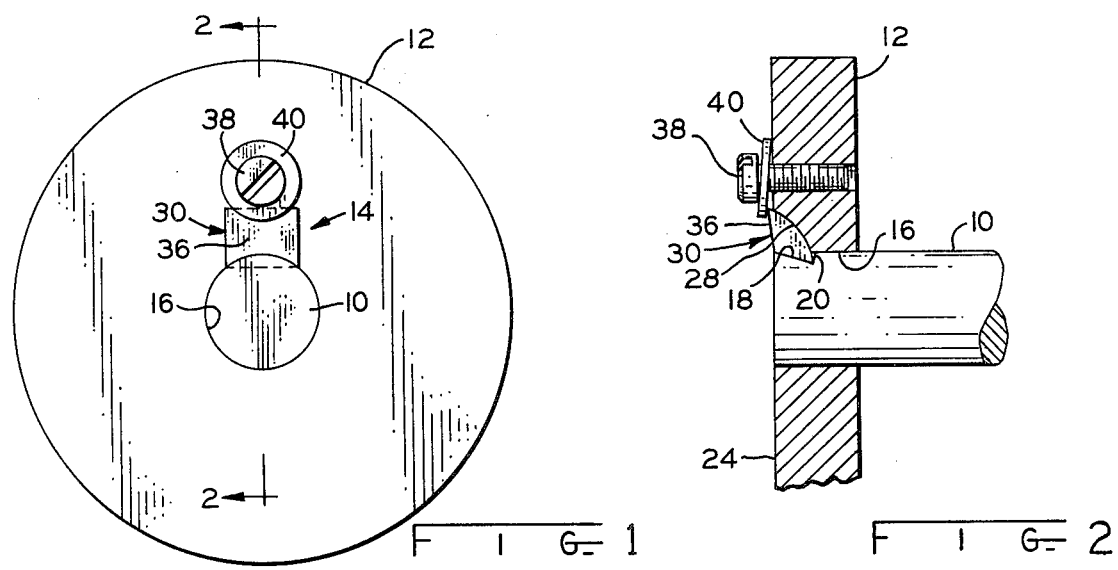
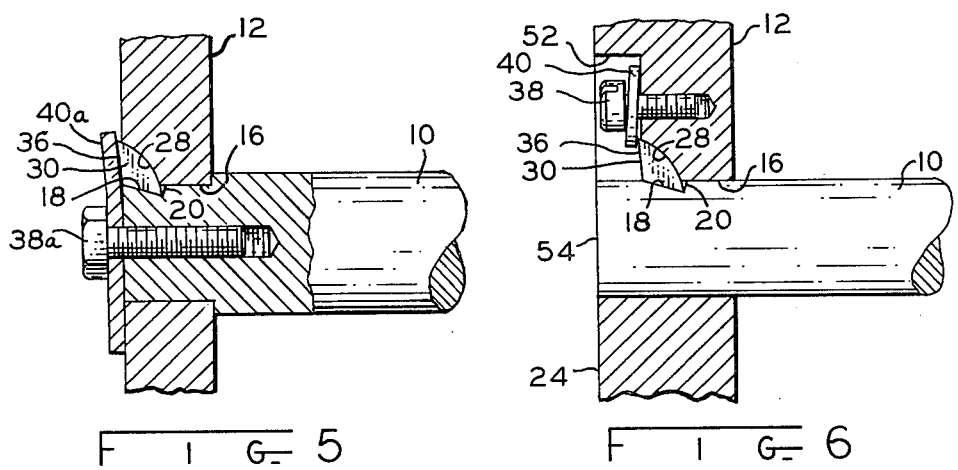
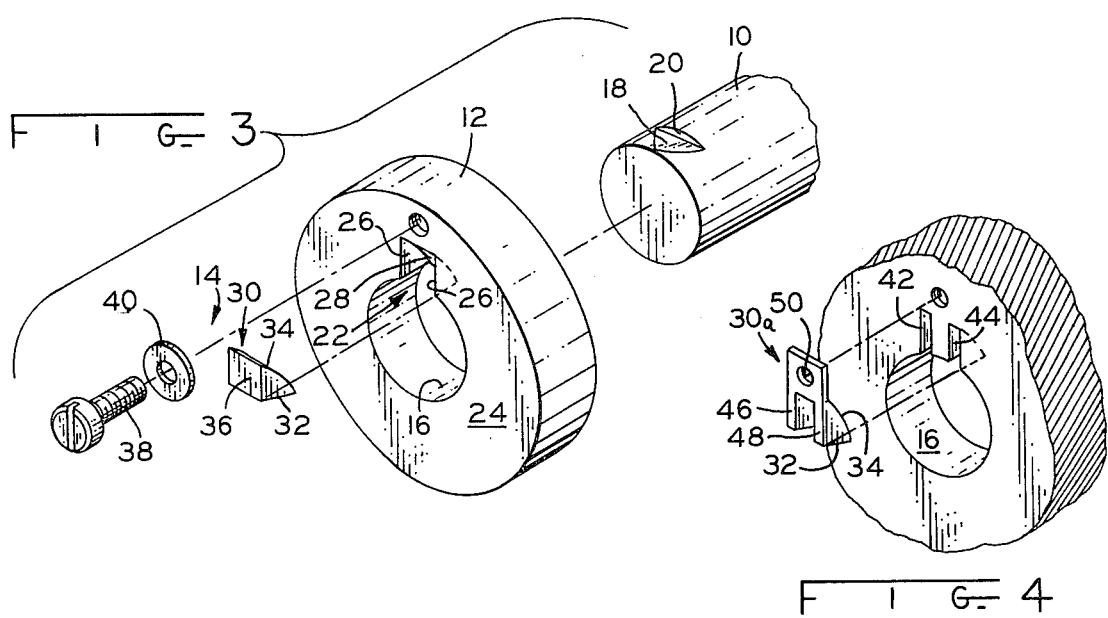

KEY DEVICE FOR LOCKING AN ELEMENT TO A SHAFT

BACKGROUND OF THE INVENTION

1. Field of the Invention

The present invention relates to key devices and more particularly to such devices for locking a shaft and element together against relative movement.

2. Description of the Prior Art

Key devices for locking shafts and other elements together are well known, typical of these being disclosed in U.S. Pat. Nos. 603,692; 709,510; 783,762; 927,167; 2,019,463; 2,973,979; 3,222,884; 3,797,949; 3,893,779 and 4,131,381.

SUMMARY OF THE INVENTION

This invention relates to a key device for locking an element to a shaft for rotation therewith which includes a shaft having a key-engaging surface provided with first and second opposite ends. This key-engaging surface extends axially of the shaft and angles radially inwardly toward the shaft axis from the outer periphery thereof. The first end of the key-engaging surface is located at the shaft periphery. The shaft is provided with a radially extending shoulder at the second end of the key-engaging surface. An element having a shaft-receiving opening receives that portion of the shaft having the key-engaging surface. The element is provided with an outer side and has a radially extending keyway which opens through the shaft-receiving opening in registry with the key-engaging surface. The keyway is provided further with a rear cam surface which extends angularly from the outer side of the element at a point radially spaced from the shaft-receiving opening to the shoulder on the shaft. A key is received by the keyway and is provided with a first side portion engaged with the key-engaging surface. A threaded fastener is secured to one of said element and shaft and is engaged with a second side portion of the key for retaining the latter in the keyway and forcing it into engagement with the key-engaging surface. By this means, the shaft and element are positively locked against relative motion both rotationally and axially.

It is an object of this invention to provide improvements in key devices for locking an element to a shaft.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a front view of one embodiment of this invention showing a locking device which secures a shaft and a wheel-like element together;

FIG. 2 is a fragmentary sectional view taken substantially along section line 2—2 of FIG. 1;

FIG. 3 is an exploded perspective view of the same embodiment;

FIG. 4 is a fragmentary, exploded perspective view of another embodiment of this invention;

FIG. 5 is a section like FIG. 2 of still another embodiment of this invention; and FIG. 6 is another sectional view like that of FIG. 2 showing yet another embodiment of this invention.

DESCRIPTION OF THE PREFERRED EMBODIMENT

Referring to the drawings, a shaft 10 which may be rotatable has locked thereto a wheel-like element 12 by means of a key device indicated generally by the numeral 14. The element 12 is provided with a cylindrical opening 16 having a sliding fit with the shaft 10. The shaft 10 is provided with a key-engaging surface 18 which is flat and having opposite ends spaced axially of the shaft 10. The end of the surface 18 disposed adjacent to the end of the shaft 10 terminates at the shaft periphery. The surface 18 angles radially inwardly toward the shaft axis and terminates in a radially extending shoulder 20 in the shaft.

The element 12 is provided with a radially extending keyway generally indicated by the numeral 22 which opens through the outer side 24 of the element 12 and also through the bore 16 in registry with the key-engaging surface 18. The opposite radial sides 26 of the keyway are essentially parallel and extend substantially radially of the element 12. The rear or inner sides 28 of the keyway is smoothly curved as shown, extending from the outer side 24 of the element 12 to the shoulder 20 on the shaft 10. This curved side 28 serves as a cam surface.

A key 30 is received by the keyway 22 in intimate engagement with the key-engaging surface 18 on the shaft 10 and the cam surface 28 on the element 12. This key 30 has a width providing a sliding fit with the sides 26, a flat side 32 which intimately engages the key-engaging surface 18, a curved surface 34 which conforms to the curvature of the cam surface 28, and a third flat side 36 which extends generally radially from the shaft 10 substantially coplanar with the outer side 24 of the element 12. With the key 30 received by the keyway 22, the key side 34 intimately conforms to and engages the cam surface 28, the side 32 intimately engages the cam engaging surface 18, and the side 36 lies substantially in the plane of the outer side 24 of the element 12 but protudes slightly therefrom as shown more clearly in FIG. 2. A threaded fastener 38 is secured to the element 12 and has a head and washer 40 which engages the radially outer extremity of the key side 36 thereby to force the key 30 along the cam surface 28 into intimate engagement with the key-engaging surface 18 of the shaft 10. The threaded fastener 38 is tightened to an extent as forces the key 30 into engagement with the surface 18. Since the key 30 substantially fills the keyway 22, the element 12 is securely locked to the shaft 10 against both relative rotational and axial movement.

In order to disassemble the element 12 from the shaft 10, it is only necessary to unscrew the threaded fastener 38 which releases the key 30. The key is merely withdrawn from the keyway 22 thereby freeing the element 12 for removal from the shaft 10.

By reason of the cam surface 28 and the conforming side 34 on the key 20, which side 34 thereby serving as a cam follower, tightening of the threaded fastener 38 results in sufficient sliding action therebetween which permits the side 32 of the key 30 to engage forcefully the surface 18 on the shaft 10. The precise curvature of the cam surface 28 is critical only to the extent that it facilitates camming of the key 30 into intimate engagement with the key-engaging surface 18.

FIG. 4 discloses another embodiment of this invention wherein the keyway is formed in two portions or slots indicated by the numerals 42 and 44. The key 30a is configured substantially like that of key 30 with the exception that it is bifurcated as shown. Above the furcations 46 and 48, the key 30a is flat and provided with an opening 50 for receiving the threaded fastener 38 therethrough. The key 30a is relatively rigid with the side 32 being at such an angle that when the threaded fastener 38 is tightened into place, the side 32 will be force-fitted against the flat surface 18 on the shaft 10. The furcations 46 and 48 are sized to have sliding fits with the slots 42 and 44.

Referring to FIG. 5, the arrangement there shown is identical to that of FIG. 2 with the exception that the threaded fastener 38a is secured to the shaft 10 and the washer 40a is made sufficiently large in diameter to overlie the key 30 thereby to force it into intimate, tight engagement with the flat surface 18 on the shaft 10.

The embodiment of FIG. 6 is also similar to that of FIG. 2 with the exception that the element 12 is provided with a recess 52 and the key-engaging surface 18 is spaced from the distal end 54 of the shaft 10. As shown, the head of the threaded fastener 38 and the washer 40 are disposed within the recess 52 such that no part of the key device protrudes beyond the outer side 24 of the element 12.

More than one key device as disclosed can be used for securing a shaft and element together. When the key device is installed, the element and shaft are securely locked together against both rotational and axial movement. Assembly and disassembly are easily performed. Slightly loosening of the threaded fastener in this invention, which is not sufficient to permit the key to withdraw from the confinement of the flat surface on the shaft will not cause disengagement of the element from the shaft. The key arrangement locates the element precisely in axial and rotational positions on the shaft. The key further provides a tight surface-to-surface engagement between both radial and axial surfaces on the shaft and element, and using sliding fits, the key is solidly integrated between the element and shaft. The conventional use of hubs on gears, wheels, pulleys and the like for receiving set screw retainers is eliminated.

While there have been described above the principles of this invention in connection with specific apparatus, it is to be clearly understood that this description is made only by way of example and not as a limitation to the scope of the invention.

What is claimed is:

1. A key device for locking an element to a shaft for rotation therewith comprising a shaft having a key-engaging surface provided with first and second opposite ends and which extends axially of said shaft and angles radially inwardly toward the shaft axis from the outer periphery, said first end being at said periphery, said shaft having a radially extending shoulder at said second end, an element having a shaft-receiving opening which receives that portion of said shaft having said key-engaging surface, said element having an outer side and a radially extending keyway which opens through said shaft-receiving opening in registry with said key-engaging surface, said keyway having a rear cam surface which extends angularly from the outer side of said element at a point radially spaced from said shaft-receiving opening to said shoulder on said shaft, a key received by said keyway and provided with a first side portion engaged with said key-engaging surface, a threaded fastener secured to one of said element and shaft and operatively engaged with a second side portion of said key for retaining said key in said keyway and forcing it into engagement with said key-engaging surface, said cam surface being smoothly curved in a direction away from said outer side of said element, said key having a third side portion provided with a curvature which conforms to the curvature of said cam surface.

2. The key device of claim 1 wherein said key-engaging surface is flat, said first side portion of said key being flat and intimately engaged with said key-engaging surface between said first and second ends thereof.

3. The key device of claim 2 wherein the second side of said key is flat and extends substantially radially outwardly from said shaft, the radially outer portion of said second side protruding slightly outwardly of said outer element side thereby to be operatively engaged by said threaded fastener.

4. A key device for locking an element to a shaft for rotation therewith comprising a shaft having a key-engaging surface provided with first and second opposite ends and which extends axially of said shaft and angles radially inwardly toward the shaft axis from the outer periphery, said first end being at said periphery, said shaft having a radially extending shoulder at said second end, an element having a shaft-receiving opening which receives that portion of said shaft having said key-engaging surface, said element having an outer side and a radially extending keyway which opens through said shaft-receiving opening in registry with said key-engaging surface, said keyway having a rear cam surface which extends angularly from the outer side of said element at a point radially spaced from said shaft-receiving opening to said shoulder on said shaft, a key received by said keyway and provided with a first side portion engaged with said key-engaging surface, a threaded fastener secured to one of said element and shaft and operatively engaged with a second side portion of said key for retaining said key in said keyway and forcing it into engagement with said key-engaging surface, said keyway including two spaced slots, said key being bifurcated and sized to be slidably received by said spaced slots.

5. The key device of claim 4 wherein said key-engaging surface is flat, said first side portion of said key being flat and intimately engaged with said key-engaging surface between said first and second ends thereof, said cam surface being smoothly curved in a direction away from said outer side of said element, said key having a third side portion provided with a curvature which conforms to the curvature of said cam surface.

6. The key device of claim 5 wherein the second side of said key is flat and extends substantially radially outwardly from said shaft, the radially outer portion of said second side joining the furcations thereof and having an aperture which receives said threaded fastener.

* * * * *